June 13, 1972   C. F. DE LONG ET AL   3,669,691
PRODUCE COATING
Filed Jan. 13, 1970

INVENTOR
CHARLES F. DE LONG
THOMAS H. SHEPHERD

United States Patent Office 3,669,691
Patented June 13, 1972

3,669,691
PRODUCE COATING
Charles F. De Long, New York, N.Y., and Thomas H. Shepherd, Hopewell, N.J., assignors to National Patent Development Corporation, New York, N.Y.
Continuation-in-part of application Ser. No. 872,016, Oct. 29, 1969. This application Jan. 13, 1970, Ser. No. 2,632
Int. Cl. A23b 7/16
U.S. Cl. 99—168
25 Claims

ABSTRACT OF THE DISCLOSURE

Produce is coated with hydrophilic polymers that permit a reduced rate of water vapor transmission and selective permeability to gas transport. The polymer is either a water insoluble, organic solvent soluble hydrophilic polymer consisting of polymers of a hydroxy lower alkyl acrylate, a hydroxy lower alkyl methacrylate, a hydroxy lower alkoxy lower alkyl acrylate or methacrylate or a water soluble polymer of a hydrophilic hydroxyalkyl acrylate or methacrylate.

---

Figure 1:
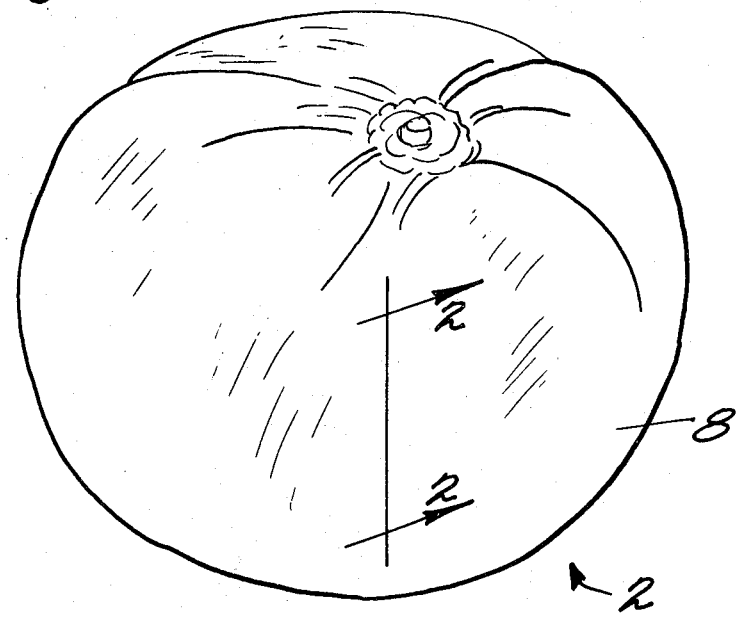

This application is a continuation-in-part of application Ser. No. 872,016, entitled "Produce Coating," filed Oct. 29, 1969, and now abandoned.

It has previously been proposed to coat fruits and vegetables with waxes and resins. Typical examples of such coatings are shown in Redlinger U.S. Pat. 2,333,887 who first coats fruits, vegetables and other foodstuffs with rubber latex and then with a natural or synthetic resin, e.g. page 2, col. 2, lines 20–69. Among the resins disclosed are acrylates, specifically polymerized methyl methacrylate and polymerized butyl methacrylate. Polymerized methyl methacrylate and polymerized methyl methacrylate are not hydrophilic nor are they permeable to moisture vapor.

Cothran Patent 2,700,025 discloses coating fruit and vegetables with a combination of wax, terpene resins and phenolic resins. Gericke 2,755,189 shows the use of wax coatings with terpene and styrene resins for fruits and vegetables. Scott Patent 2,872,325 employs vinylidene chloride-acrylonitrile polymers as coatings for fruits, vegetables and other foodstuffs. Such a polymer is known to have a very low moisture vapor transmission rate.

There have also been employed coatings of vinyl acetate polymers and copolymers, Rosenfield Patent 3,410,696, Winterberg Patent 2,961,322 and Hemming Patent 2,346,755 (with or without polyvinyl alcohol). Recently there has been proposed the use of the gum, carboxymethyl cellulose, together with another gum in Mason Patent 3,472,622 which points out that carboxymethyl cellulose alone is unsatisfactory. The carboxymethyl cellulose products for example do not give the maximum protection against atmospheric oxygen. All of the methods suggested in the prior art have disadvantages as coatings for fruits and vegetables.

It is an object of the present invention to prepare an improved coating for foodstuffs, particularly fresh fruits and vegetables to impart prolonged storage life thereto.

Another object is to reduce but not eliminate moisture loss from foodstuffs, particularly fresh fruits and vegetables.

A further object is to develop a non-toxic coating for such foodstuffs.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by using as the coating certain polymers which are hydrophilic and permeable to moisture vapor while exhibiting selective permeability to gas transport, e.g. permitting carbon dioxide and ethylene gas to escape from fresh fruits and vegetables.

The coatings of the present invention while serving to reduce moisture loss and decrease the rate of transpiration through the skin of the fruit or vegetable (or other foodstuff) are not totally occlusive, however, and allow natural aging processes to proceed, although at a greatly reduced rate. As a result, the coatings are useful in prolonging the storage life of foodstuffs, particularly of produce, i.e. fresh fruits and vegetables subsequent to picking and to reduce the effects of handling damage.

Preferably the polymers employed are non-toxic.

The hydrophilic polymers are coated directly on the foodstuffs, e.g. by dipping, spraying or other technique to coat the skin of the fruit or vegetable. The polymer can be applied either in solution or it can be formed in situ on the foodstuff to form a thin coating of the solid polymer. Preferably the coating is 0.25 to 0.75 mil but it can be from 0.1 to 2 mils.

The hydrophilic polymers of the present invention are preferably water insoluble so that the coating will not be removed if the foodstuff becomes wet or is subjected to high humidity. On the other hand, when it is desirable to have a readily removable coating the hydrophilic polymer can be of the water soluble type.

As fresh fruits and vegetables there can be used for example, citrus fruits, e.g. oranges, lemons, limes, grapefruit, and other fruits such as bananas, cherries, grapes, plums, pears, peaches, apricots, melons, e.g. contaloupes, watermelons, honeydew melons, and cranshaw melons, avocados, pineapple, apples, berries, e.g. strawberries, raspberries, black berries, blue berries, and fresh vegetables such as tomatoes, cucumbers, green peas, beans, egg plant, beets, potatoes, yams, black-eyed peas, squash, corn, pumpkins, sweet potatoes, cabbage, celery, lettuce, turnips, spinach.

It has further been found that the coatings of the present invention protect the fruit or vegetable from attack by fungus spores and insect infestation if applied before contact with spores or insects.

As the hydrophilic polymer, there is preferably employed a hydrophilic acrylate or methacrylate polymer, most preferably a polymer of a hydroxy lower alkyl acrylate or methacrylate such as hydroxyethyl acrylate, hydroxypropyl acrylate, hydroxyethyl methacrylate or hydroxypropyl methacrylate.

There can also be employed other hydrophilic polymers such as polymers of acrylamide, N-alkyl acrylamides with 1–3 carbon atoms in the alkyl group, e.g. N-methyl acrylamide and N-propyl acrylamide, methacrylamide, N-alkyl methacrylamides, e.g., N-methyl methacrylamide and N-isopropyl methacrylamide, diacetone acrylamide, lower alkoxy lower alkyl acrylates and methacrylates, e.g. ethoxyethyl acrylate, ethoxyethyl methacrylate, methoxyethyl acrylate, methoxyethyl methacrylate, di-lower alkylene glycol monoacrylates and methacrylates, e.g. dipropylene glycol monoacrylate, dipropylene glycol monomethacrylate, diethylene glycol monoacrylate, diethylene glycol monomethacrylate, N-vinyl pyrrolidone.

These hydrophilic monomers can be homopolymerized or can be copolymerized with each other or with 1 or more other monomers.

These can also be included a minor fraction of acrylic acid, methacrylic acid, itaconic acid, maleic acid anhydride, or fumaric acid.

When other monomers are employed they should not be present in an amount sufficient to impair the hydrophilic properties or to substantially reduce the rate of moisture loss. Thus there can be used 0.1 to not over 50% of non hydrophilic monomers such as styrene, alpha methyl styrene, vinyl acetate, vinyl butyrate, vinyl chloride, acrylonitrile, lower alkyl acrylates and methacrylates, e.g. methyl acrylate, ethyl acrylate, butyl acrylate, methyl methacrylate and butyl methacrylate. Preferably the non-hydrophilic monomer is used in an amount of not over 20%.

The hydrophilic polymers which are water insoluble are water swellable, e.g. to an extent of 20 to 120%.

A small amount of a cross-linking agent can be present in the monomer mixture being polymerized providing it does not render the polymer insoluble in volatile organic solvents. For example, the small amount of ethylene glycol dimethacrylate normally present in hydroxyethyl methacrylate (about 0.1%) need not be removed.

The water insoluble hydrophilic polymer is normally applied to the produce as a solution in a volatile organic solvent, e.g. lower aliphatic alcohols such as ethyl alcohol, isopropyl alcohol, and propyl alcohol or mixtures of such alcohols with minor amounts of water, e.g. up to 30% water and the solvent evaporated to leave a thin coating of the solid hydrophilic water insoluble polymer.

When it is desired to employ a water soluble polymer there can be employed copolymers water soluble hydrophilic polymers of hydroxyalkyl acrylates and methacrylates. Thus there can be employed copolymers of hydroxyethyl acrylate, hydroxypropyl acrylate, hydroxyethyl methacrylate or hydroxypropyl methacrylate with 0.5 to 20% of a water solubilizing copolymerizable monomer. The copolymerizable monomer should be present in amount sufficient to be sure that the polymer is completely soluble in water. Of course, mixtures of hydroxyalkyl acrylates and methacrylates can be employed. Thus, while the hydroxyalkyl methacrylate esters are preferred as starting material up to about 40% by weight of hydroxyalkyl acrylate can be used in the hydroalkyl methacrylate containing mixture of monomers.

Examples of organic acids for making the ammonium and alkali metal salts include acrylic acid, methacrylic acid, maleic acid, fumaric acid, itaconic acid, aconitic acid, cinnamic acid, crotonic acid, cyclohexene, carboxylic acid, propiolic acid, mesaconic acid, citraconic acid, vinyl sulfonic acid, p-vinylbenzenesulfonic acid, partial esters such as mono 2-hydroxyethyl citraconate, mono 2-hydroxypropyl itaconate, mono 2-hydroxyethyl itaconate, mono 2-hydroxypropyl citraconate, mono 2-hydroxyethyl maleate, mono 2-hydroxypropyl fumarate, mono methyl itaconate, monoethyl itaconate, mono methyl Cellosolve itaconate (methyl Cellosolve is the monomethyl ether of diethylene glycol), mono methyl Cellosolve maleate, mono-2-hydroxyethyl aconitate.

Examples of strong acid salts of polymerizable amino containing monomers are the hydrochloric, hydrobromic, sulfuric acid, nitric acid, phosphonic acid, benzene sulfonic acid, naphthalene sulfonic acid, trichloroacetic acid, and p-toluene sulfonic acid salts of diethylaminoethyl methacrylate, dimethyl aminoethyl methacrylate, monomethylaminoethyl methacrylate, t-butylaminoethyl methacrylate, p-amino-styrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-amino ethyl methacrylate. The alkylaminoethyl acrylates and methacrylates are preferred in group (2).

The water soluble polymers used in the invention are usually of infinite solubility in water, although at concentrations above 30% solution viscosity rises sharply. They can be applied to the fruit or vegetable as a solution in water or volatile organic solvent, e.g. lower aliphatic alcohols such as methyl alcohol, ethyl alcohol, isopropyl alcohol, propyl alcohols or mixtures of such solvents with water, e.g. 5 to 95% water. The water and/or other solvent employed is evaporated to leave a thin coating of the solid hydrophilic water soluble polymer.

Solubility of the polymers is pH dependent. For example, water soluble polymers containing salts of carboxylic or sulfonic acids as part of the structure will not be soluble in water at a pH below about 3.5 and polymers containing amine salts as part of the structure will not be soluble in water at a pH above about 8.5. Advantageously a pH of about 7 is employed when the hydrophilic water soluble polymer coating is applied to the fruit or vegetable.

Figure 2:
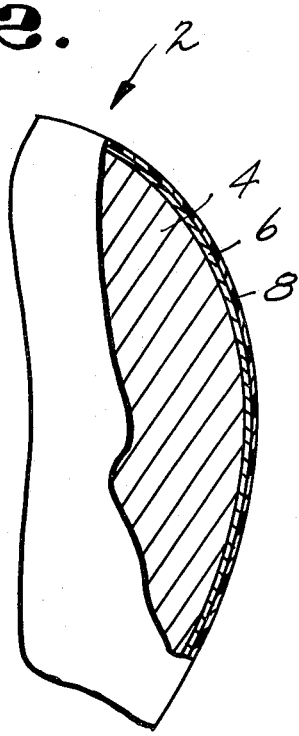

The invention will be understood best in connection with the drawings wherein:

FIG. 1 is a plan view of a tomato coated according to the invention and FIG. 2 is a partial sectional view taken along the line 2—2 of FIG. 1.

Referring more specifically to the drawings a tomato designated generically at 2 and comprising an interior portion 4 and skin 6 has coated directly on the skin a thin (0.5 mil.) coating of a hydroxyethyl methacrylate polymer 8 applied directly over the skin.

Unless otherwise indicated, all parts and percentages are by weight.

EXAMPLE 1

Into a 30 gallon reactor were charged 25 lbs. of hydroxyethyl methacrylate and 80 lbs. of ethanol. The reactor was heated to 75° C. and 85 grams of t-butyl peroctoate added as a catalyst. The reactor was purged with nitrogen, closed and heated at 85° C. for 7 hours. The solid hydroxyethyl methacrylate polymer product was isolated by precipitation into water and it was dried. A yield of 23 lbs. of polymer having an intrinsic viscosity of 0.4 (determined in methyl Cellosolve) was obtained.

EXAMPLE 2

One lb. of the polymer prepared in Example 1 was dissolved in 95% ethanol to provide a 10 weight percent solution. The solution was used for dip coating of (a) green freshly picked tomatoes and (b) just ripened tomatoes. The coating was about 0.5 mil thick. The coated tomatoes and uncoated tomatoes from the same lot were allowed to stand at room temperature.

The uncoated green tomatoes ripened on standing approximately 3 days, whereas the coated green tomatoes required 9 days to ripen.

The uncoated ripe tomatoes severely deteriorated after standing 5 days while the coated ripe tomatoes showed no sign of deterioration after 10 days.

EXAMPLE 3

The polymer solution of Example 2 was used to dip coat a freshly picked ripe pineapple which was allowed to stand at room temperature after coating. An uncoated control pineapple showed evidence of rotting after 6 days whereas the coated pineapple showed no deterioration after 14 days.

EXAMPLE 4

The polymer solution of Example 2 was used to dip coat green bananas. The bananas were stored at room temperature along with an uncoated control group of green bananas. After 5 days the uncoated bananas had ripened and they had deteriorated severely after 10 days. After 10 days the coated bananas had not ripened.

EXAMPLE 5

Freshly picked apples were dip coated with the polymer solution of Example 2 to give a glossy appearance. These apples when placed in refrigerated storage gave no evidence of an "exotherm" or heat generation. In contrast, apples coated with wax for improved appearance generated heat in storage. This heat generation greatly increased refrigeration costs for the wax coated apples.

EXAMPLE 6

Using the procedure of Example 1 copolymers were prepared from the monomer mixtures indicated. The viscosities of the solid polymers produced were measured in methyl Cellosolve.

| Example | Monomer | Percent | Polymerization time (hrs.) | Polymer yield, percent | Intrinsic viscosity |
|---|---|---|---|---|---|
| A | Hydroxyethyl methacrylate<br>N-vinyl pyrrolidone | 70<br>30 | 11 | 80 | 0.55 |
| B | Hydroxyethyl methacrylate<br>Methacrylic acid | 90<br>10 | 7 | 92 | 0.6 |
| C | Hydroxypropyl methacrylate<br>Ethoxyethyl methacrylate<br>Methacrylic acid | 60<br>30<br>10 | 8 | 88 | 0.5 |
| D | Ethoxyethyl methacrylate<br>Methoxyethyl methacrylate<br>Acrylamide | 40<br>40<br>20 | 6 | 96 | 0.65 |
| E | N-vinyl pyrrolidone<br>Ethoxyethyl methacrylate | 50<br>50 | 12 | 75 | 0.45 |
| F | Methacrylamide<br>Itaconic acid | 80<br>20 | 10 | 70 | 0.4 |

The polymers prepared in Examples 6A, B, C, D, E and F were each dissolved in ethanol and used to coat tomatoes, pineapples and bananas in a manner similar to that in Examples 2, 3 and 4. In each case deterioration of the vegetable or fruit was retarded.

The hydrophilic polymers employed (or prepared) in Examples 1–6 are all water insoluble. In the following examples the hydrophilic polymers were all water soluble.

EXAMPLE 7

Into a 30-gallon reactor was charged 40 lbs. of hydroxyethyl methacrylate, 4 lbs. of methacrylic acid, 120 lbs. of methanol and 0.05 lb. of t-butyl peroctoate. The reactor was heated to 80° C. and allowed to stir 6 hrs. to effect polymerization. To the polymer solution thus obtained was added 2.5 lbs. of sodium methoxide dissolved in 25 lbs. of methanol. The resulting solution was added slowly to a 10-fold excess of acetone to precipitate the polymer. After drying, a yield of 36 lbs. of water soluble polymer was obtained.

EXAMPLE 8

Into a 30-gallon reactor was charged 40 lbs. of hydroxyethyl methacrylate, 1 lb. of methacrylic acid, 120 lbs. of methanol and 0.05 lb. of t-butyl peroctoate. The reactor was heated to 85° C. and allowed to stir 5 hours to effect polymerization. The polymer was isolated by precipitation from the alcohol solution with water, and allowed to dry. A yield of 37 lbs. was obtained. The polymer was re-dissolved in methanol to provide a 10 weight percent solution. To the solution was added 1 liter of 10% ammonium hydroxide, and the solution was spray-dried to provide a water soluble powder.

EXAMPLE 9

Into a 30-gallon reactor was charged 40 lbs. of hydroxyethyl methacrylate, 3 lbs. of dimethylaminoethyl methacrylate, 120 lbs. of methanol and 0.05 lb. of diisopropyl percarbonate. The reactor was heated to 75° C. and was stirred 7 hours to effect polymerization. The polymer was isolated by precipitation with water, and dried. A yield of 35 lbs. was obtained. 10 grams of the polymer was dissolved in 90 g. of 0.1 N HCl and the pH was adjusted to 4.5 with dilute sodium hydroxide and the polymer dried.

EXAMPLE 10

One lb. of the polymer prepared in Example 7 was dissolved in water and used to dip coat grapefruit. The water was removed by evaporation to obtain grapefruit of increased resistance to deterioration.

EXAMPLE 11

The polymer of Example 8 was dissolved in 95% alcohol to produce a 10% weight solution and applied as a coating to cherries and the alcohol evaporated.

EXAMPLE 12

The polymer of Example 7 was dissolved in a 50:50 methanol/water mixture to provide a solution containing 15% solids. Potatoes were coated with the solution and the solvent removed by evaporation with the aid of warm air to provide potatoes protected against sprouting in storage.

EXAMPLE 13

The polymer of Example 9 was dissolved in ethanol to give a solution containing 15% solids. The solution was used to coat bananas by the dip method and the solvent evaporated.

The coatings obtained in Examples 10–13 were readily removed by simply washing the fruit or vegetable in water.

What is claimed is:

1. A product comprising produce and a solid protective coating directly thereon of a hydrophilic polymer which is either (1) a water insoluble, organic solvent soluble hydrophilic polymer selected from the group consisting of polymers of a hydroxy lower alkyl acrylate, a hydroxy lower alkyl methacrylate, a hydroxy lower alkoxy lower alkyl methacrylate, or (2) a water soluble polymer of a hydrophilic hydroxyalkyl acrylate or methacrylate, said coating permitting a controlled but reduced rate of water vapor transmission and selective permeability to gas transport.

2. A product according to claim 1 wherein the coating is applied to a thickness of 0.1 to 2 mils.

3. A product according to claim 1 which is a fresh fruit or vegetable having on the external surface thereof a 0.1 to 2 mil coating of said polymer.

4. A product according to claim 1 which is a fresh fruit or vegetable wherein said polymer is a polymer of hydroxyethyl acrylate, hydroxyethyl methacrylate, hydroxypropyl acrylate or hydroxypropyl methacrylate.

5. A product according to claim 4 which is a fruit.

6. A product according to claim 5 which is a citrus fruit.

7. A product according to claim 5 wherein the fruit is pineapple or bananas.

8. A product according to claim 5 wherein the fruit is apples, pears, peaches, plums or apricots.

9. A product according to claim 5 wherein the fruit is a melon.

10. A product according to claim 4 which is a vegetable.

11. A product according to claim 10 wherein the vegetable is a tomato.

12. A product according to claim 4 wherein the polymer consists essentially of hydroxyethyl methacrylate polymer soluble in alcohol.

13. A product according to claim 1 wherein the coating is the water soluble polymer (2).

14. A product according to claim 13 which is a fresh fruit or vegetable having on the external surface thereof a 0.1 to 2 mil coating of said polymer.

15. A product according to claim 13 which is a fresh fruit or vegetable and wherein the water soluble polymer, is a copolymer of a member of the group consisting of hydroxyethyl acrylate, hydroxypropyl acrylate, hydroxyethyl methacrylate and hydroxypropyl methacrylate with up to 20% of a water solubilizing copolymerizable monomer selected from the group consisting of (1) alkali metal and ammonium salts of a polymerizable organic acid and (2) strong acid salts of polymerizable organic amines, said water solubilizing monomer units being present in the copolymer in sufficient amounts to render the copolymer completely soluble in water.

16. A product according to claim 15 which is a fruit.

17. A product according to claim 15 which is a vegetable.

18. A product according to claim 15 wherein said copolymerizable monomer is ethylenically unsaturated.

19. A product according to claim 18 wherein the acrylate or methacrylate is hydroxyethyl methacrylate and said copolymerizable monomer is the salt of a polymerizable organic acid.

20. A product according to claim 18 wherein the acrylate or methacrylate is hydroxyethyl methacrylate and said copolymerizable monomer is a salt of an organic amine.

21. A product comprising produce and a solid protective coating directly thereon of a water insoluble, organic solvent soluble, hydrophilic polymer selected from the group consisting of polymers of a hydroxy lower alkyl acrylate, a hydroxy lower alkyl methacrylate, a hydroxy lower alkoxy lower alkyl acrylate and a hydroxy lower alkoxy lower alkyl methacrylate, said coating permitting a controlled but reduced rate of water vapor transmission and selective permeability to gas transport.

22. A process of preparing the product of claim 21 comprising applying the polymer in solution in a volatile organic solvent to the produce and then removing the solvent.

23. A process according to claim 22 wherein the produce is a fresh fruit or vegetable, the polymer is a polymer of hydroxyethyl acrylate, hydroxyethyl methacrylate, hydroxypropyl acrylate or hydroxypropyl methacrylate and the coating is applied to a thickness of 0.1 to 2 mils.

24. A process according to claim 23 wherein the polymer consists essentially of hydroxyethyl methacrylate polymer soluble in alcohol and the polymer is applied to the produce as a solution in alcohol.

25. A product according to claim 21 wherein the polymer coating consists essentially of hydroxyethyl methacrylate polymer soluble in alcohol and the coating has a thickness of 0.25 to 0.75 ml.

References Cited
UNITED STATES PATENTS

| | | | |
|---|---|---|---|
| 2,213,557 | 9/1940 | Tisdale et al. | 99—168 |
| 3,220,960 | 11/1965 | Wichterle | 260—29.6 H |
| 3,245,932 | 4/1966 | Glavis et al. | 117—161 UN |
| 3,493,500 | 2/1970 | Volk | 260—29.6 H |
| 3,410,696 | 11/1968 | Rosenfield | 99—168 |
| 2,723,248 | 11/1955 | Wright | 260—33.4 |
| 3,520,949 | 7/1970 | Shepherd et al. | 117—161 UC |
| 3,576,760 | 4/1971 | Gould et al. | 99—171 |

MORRIS O. WOLK, Primary Examiner

S. B. DAVIS, Assistant Examiner

U.S. Cl. X.R.

99—166; 117—161 UB; 260—29.6 H